Nov. 13, 1923.
F. P. McBERTY
1,474,199
UNIVERSAL POINT AND CARRIER FOR WELDERS
Filed June 30, 1921
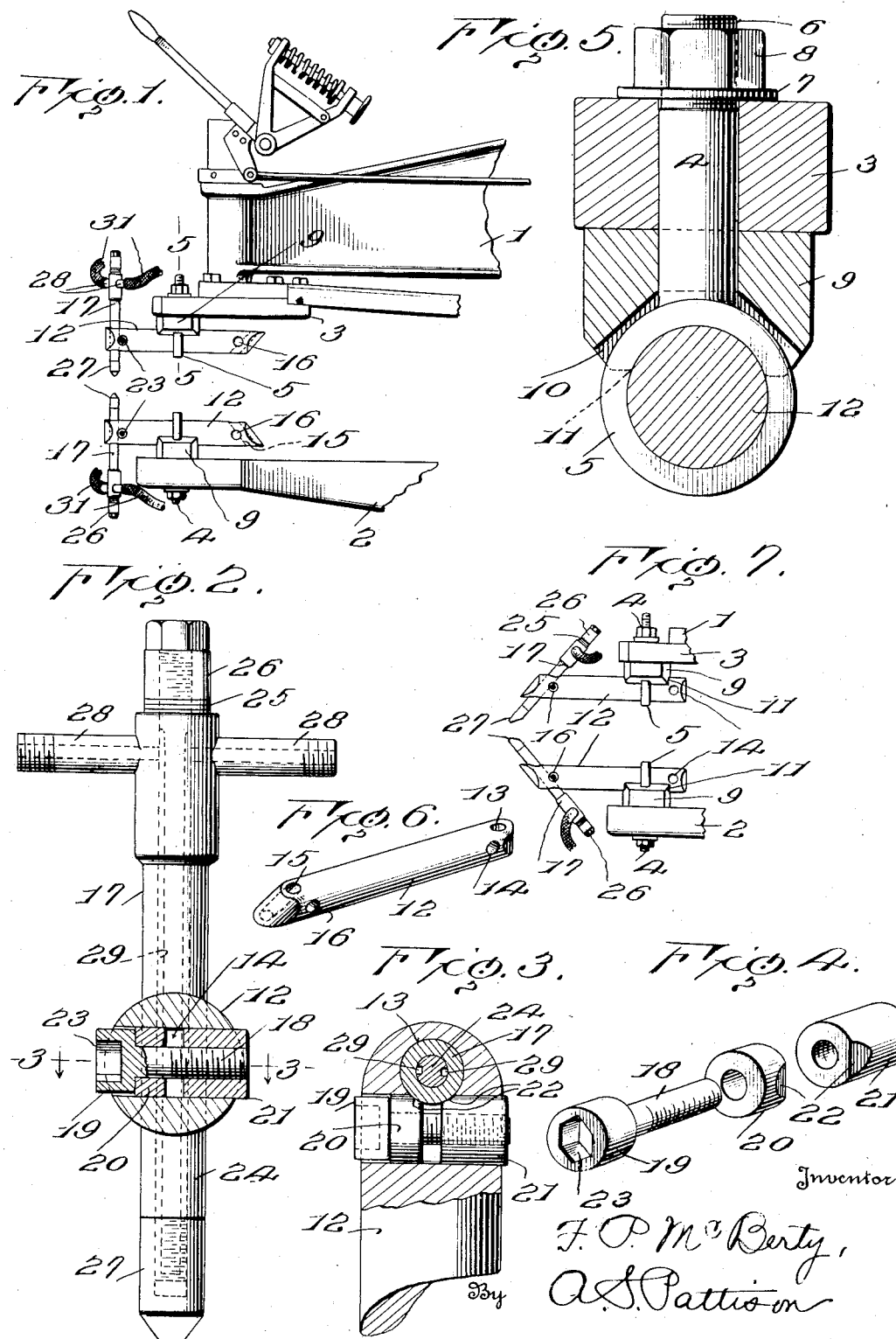
Inventor
F. P. McBerty,
By A. S. Pattison
Attorney Patented Nov. 13, 1923.

1,474,199

UNITED STATES PATENT OFFICE.

FRED P. McBERTY, OF WARREN, OHIO.

UNIVERSAL POINT AND CARRIER FOR WELDERS.

Application filed June 30, 1921. Serial No. 481,569.

*To all whom it may concern:*

Be it known that I, FRED P. McBERTY, a citizen of the United States, residing at Warren, in the county of Trumbull and State of Ohio, have invented certain new and useful Improvements in Universal Points and Carriers for Welders, of which the following is a specification, reference being had therein to the accompanying drawing.

This invention relates to improvements in universal point and carrier for welders and more particularly to a novel construction of welding points and the holders therefor for use on welding machines, more particularly spot welding machines, of the type now found in the art and in the open market.

The primary object of my invention is to provide a novel construction of welder point and holder whereby the welding points can be placed vertically, or set at an angle, for the purpose of facilitating work upon material of different shape.

A further object of my invention is to provide a reversible point and holder for welding points whereby the points can be quickly and easily adjusted to different positions.

A still further object of my invention is to provide a novel means for locking or fastening the welder points in their adjusted position within the carrier.

Another object of my invention is to provide a welder point carrier having a novel locking means for locking the point within the carrier and thereby providing a welder point and carrier for welding machines by which the welder point can be adjusted to a vertical position, an angular position, and further adjusted to and from its cooperating point and also rotating in a horizontal plane.

Other and further objects and advantages of my improved construction will appear in the following specification accompanying the drawings.

In the drawings; Figure 1 is a view in side elevation showing my improved welder point carrier construction mounted on the ends of the parallel arms of a welding machine the points being adjusted in a vertical position.

Figure 2 is a view in side elevation of a welding point mounted in my improved carrier, the carrier and the means for locking the points therein being shown in transverse vertical section.

Figure 3 is a fragmental horizontal sectional view taken on the line 3—3 of Figure 2 and shows in longitudinal section the end of the carrier and the welder point therein, the locking means for the point being shown in full line.

Figure 4 is a perspective view of the welder point locking means, the parts being shown in unassembled relation.

Figure 5 is a vertical transverse sectional view taken on the line 5—5 of Figure 1.

Figure 6 is a perspective view of the carrier.

Figure 7 is a view in side elevation showing the welder points and their carriers mounted on the ends of the parallel arms of a welding machine, the points being adjusted in an angular position.

To those skilled in the art of welding, it is well known that to adapt a machine for work upon articles of different character that the welder points of the machine must be so constructed as to be adjustable to different positions so that the points can operate on all parts of the article where it is desired to make a weld.

It often occurs that a weld is desired to be made under a projecting ledge or overhanging part and to accomplish this quite often necessitates an adjustment in the position of the points.

Constructions of different characters are known in the art for providing an adjusting means for welder points but those known to the applicant all have disadvantages of one nature or another.

To provide a welder point and carrier capable of adjustment of position which will be most acceptable to the trade and more efficient and more easy of operation, the construction must be such that the adjustment can be quickly and readily accomplished so that no great delay will be occasioned to the operator of the machine. It will be obvious that the possible adjustment to the greatest number of positions will be of an advantage.

Applicant has by this invention provided a welder point and carrier embodying the features and advantages outlined above, which construction will be hereinafter more specifically described.

Referring now to the drawings in which like reference numerals designate similar parts throughout the description, 1 represents the upper arm of a welding machine (not shown) and 2 the lower arm thereof which is usually constructed so as to be vertically adjustable to and away from the upper arm of the machine.

Bolted or otherwise suitably fastened to the under side of the outer end of the upper arm 1 of the machine is a supplemental arm 3 which carries a stud 4, and eye 5 which is an integral part of the stud. The upper end of the stud is secured therethrough as at 6 and is provided with a washer 7 and nut 8 for clamping down upon the supplemental arm 3.

A saddle 9 is carried upon the stud between the arm 3 and the eye 5 and has its top in abutment with the under side of the arm while its lower face has a transverse slot or groove 10 for receiving the eye and a longitudinal concave groove or slot 11 which receives the round welder point or electrode carrier 12, which is carried in the eye 5.

As will clearly appear in Figure 6 of the drawings the welder point or electrode carrier is a round bar, usually made of copper, and has in one end an opening 13 which extends through it in a vertical line and an opening 14 which extends through it in a horizontal line at right angles to the first mentioned opening. In the other and opposite end of the carrier is an opening 15 which extends through it at an angle of approximately 30° while back of this opening is another opening 16 which extends through the carrier in a horizontal plane.

To mount the carrier on the end of the machine arm, the carrier is inserted in the eye 5 and the nut 8 is then tightened down. As the nut 8 is tightened the eye and carrier are drawn up into their respective seats or grooves 10 and 11 in the saddle 9 and are there tightly clamped. As will be apparent the carrier is horizontally adjustable by sliding it in the eye 5 and to insert or withdraw the carrier from the eye 5 is accomplished by merely loosening the nut 8.

The openings 13 and 15 in the carrier 12 are designed to carry and receive the welder points or electrodes 17. When it is desired to have the electrodes in a vertical position they are inserted in the openings 13 and when it is desired to have the electrodes extend in an angular plane the carrier 12 is reversed in the eye 5 so that the end provided with the opening 15 extends outwardly and the electrode is then inserted in this opening.

As is apparent from the drawings the electrodes slide and are adjustable in the openings in the carrier and to fasten or lock them in their adjusted position I have provided a bolt 18 provided with a head 19 which carries on the bolt abutting the head a washer 20 and abutting the washer is a nut 21 each of which are provided with beveled portions 22. This locking means is carried in the opening 14 or 16 as desired and when the bolt 18 is rotated by means of a wrench or the like inserted in the opening 23 in its head 19, the washer 20 and nut 21 are drawn towards each other until the beveled portions 22 thereof clamp the electrode or welder points 17 between them as clearly shown in Figures 2 and 3 of the drawing.

The welder points or electrodes shown in the drawing are preferably made of copper and are of the water cooled type, being provided throughout their length with a screw threaded member or stud 24, which carries on its upper end the washers 25 and the nut 26 while the lower end of the stud screw threadedly carries the point 27 of the electrode. By this construction when the points of the electrode become worn and need repointing they are easily and readily replaced by new points.

The electrodes are provided at their upper end with water connections 28 and the screw threaded member 24 of the electrode is provided with the grooves 29 through its length so that the water which is brought to the electrode by the hose or pipes 31, will flow through the water connections 28 and down the length of the electrode in the grooves 29 and practically to the outer end of the electrode points 27 as clearly shown in Figure 2 of the drawing.

In the foregoing description I have described how the carrier and the electrode are mounted on the upper arm 1 of the machine. The mounting of the electrode and carrier on the lower arm 2 of the machine is exactly similar with the exception that the supplementary arm 3 is not used but the saddle 9 and the stud 4 and eye bolt 6 are carried directly by the arm 2.

The electrical connection to the welder points can be made in any desired manner and as this feature forms no part of this invention the electrical connection has not been shown nor will it be described.

Figure 1 of the drawing shows the electrodes mounted and adjusted in a vertical position while Figure 7 shows the carriers reversed and electrodes adjusted in the angular position they assume when carried in the openings 15 of the carrier.

From the foregoing it will be seen that I have provided a novel means of mounting an electrode carrier whereby the carrier can be rotated in its securing means and it can further be adjusted horizontally therein. Due to the simple construction the adjustment is quickly and easily made.

It will be further seen that I have provided a carrier adapted to carry the electrodes in a vertical plane or to carry the electrodes in an angular plane by merely reversing the ends of the carrier which is easily accomplished.

I have also provided a means for locking the electrode in the carrier which is easy and quick of operation and my entire construction is so simple that the electrode can be removed from the carrier, the carrier reversed in its securing means and the electrode reinserted in the carrier and locked in position very quickly and with very little effort.

By the construction here shown, the carriers 12 are rotatable within the eyes 5 so that the electrode welder points 27 can be caused to extend to either side of the carriers 12, and this is true whether the electrodes 27 are supported at the angles shown in Figure 7 or vertically as shown in Figure 1. The shape of the welding points of the electrodes 27 will be varied according to the position or angle of the electrodes. It will also be understood that in addition to the several angular arrangements of the electrodes 27 by turning the carriers 12 on their axes, the carriers are adjustable back and forth in the eyes 5. By reason of this universal arrangement the electrodes 27 can be positioned to adapt them to spot weld work at substantially any point thereof irrespective of the peculiar shape of the work including making the spot weld in corners of the work or parts to be welded.

I claim—

1. A supporting means for welder electrodes or the like comprising a carrier having means in each of its ends for supporting the electrode.

2. A supporting means for welder electrodes or the like comprising a carrier having means in each of its ends for supporting the electrodes, the means in one end adapted to support the electrode in a different position than the means in the other end of the carrier, for the purpose described.

3. A supporting means for welder electrodes or the like, comprising a carrier having in both of its ends means for supporting the electrode and means for locking the electrode in the said supporting means of the carrier.

4. A supporting means for electrodes or the like, comprising a carrier having in one end a vertical passageway and in its opposite end an angular passageway, the passageways adapted to receive the electrode, and means carried transverse the carrier for locking the electrodes in the carrier passageways for the purpose described.

5. A supporting means for welder electrodes or the like, comprising a carrier provided at one end with a vertical passageway and at its opposite end with an angular passageway, the passageways adapted to receive the electrode, and passageways transverse the ends of the carrier to receive a locking means for locking the electrodes in their passageways.

6. A supporting means for welder electrodes or the like, comprising a carrier supported from a welding machine by an eye bolt, a saddle carried by the bolt adjacent the carrier, means for clamping the saddle against the carrier to lock it in its set position within the eye, and the carrier provided at its opposite ends with openings to receive the electrode, the openings in the opposite ends of the carriers being in different vertical planes, whereby when the electrode is shifted from one end of the carrier to the other the electrode will assume different positions.

7. A carrier for welder electrodes or the like, comprising means at its opposite ends for supporting the electrode in different positions, and a locking means carried transverse each end of the carrier for locking the electrode in its set position in the end of the carrier.

8. A carrier for welder electrodes or the like, comprising passageways at its opposite ends to support the electrode in different positions, and a supporting means for the carrier whereby the ends of the carrier can be reversed in the supporting means, for the purpose described.

9. A carrier for welder electrodes or the like, having passageways in its opposite ends, the passageways adapted to receive the electrode and support it in different vertical planes, locking means transverse the carrier for locking the electrodes in their passageways, and a supporting means for the carrier adapted to support and clamp the carrier in its set position, whereby the carrier ends can be reversed in the support and the electrode can be reversed in the ends of the carrier for the purpose described.

10. A carrier for welder electrodes or the like, having passageways in its opposite ends for supporting the electrodes in different vertical planes, passageways transverse the ends of the carrier and in communication with the electrode passageways, and a locking means carried within the transverse openings for locking the electrodes in their set positions in their passageways.

11. A carrier for welder electrodes or the like, provided with means in its opposite ends for supporting the electrode, and a supporting means for the carrier whereby the carrier is rotatable on its axis, for the purpose described.

12. A carrier for welder points or the like, having means at its opposite ends for supporting welder points, and a support for the carrier constructed to enable the carrier to be rotated upon its axis and to be inverted end for end within the support, for the purpose described.

13. A carrier for welder electrodes or the like, having openings for receiving the welder electrode, openings in the carrier transverse the electrode receiving openings and in communication therewith for receiving a locking member for the electrode, and a locking member carried within the transverse opening for locking the electrode in its supporting opening.

14. A carrier for welder electrodes or the like, having welder electrode receiving passageways, passageways in the carrier transverse the electrode passageways and in communication therewith, and a locking member carried within the last mentioned transverse passageway constructed to wedge the electrode in its supporting passageway.

15. A carrier for welder electrodes or the like, having passageways for receiving the welder electrode, passageways in the carrier in communication with the electrode passageways, and adapted to receive a locking member, the locking member comprising a screw threaded bolt provided with a washer and a nut, and the locking member carried within its passageway whereby the electrode is clamped between the bolt, nut and washer for locking it in its set position.

16. A carrier for welder electrodes or the like, having passageways for receiving the welder electrode, passageways transverse the electrode passageways and in communication therewith for receiving a locking member, the locking member comprising a screw threaded bolt having a nut and a washer, the washer of the locking member carried between the bolt head and nut, and the adjacent faces of the washer and nut being provided with beveled portions for clamping the electrodes to lock them in their set position.

17. A carrier for welder electrodes or the like, having passageways for receiving the welder electrode, passageways transverse the welder passageways and in communication therewith whereby the electrode extends partially into the transverse passageways, and a locking member carried within the transverse passageways and adapted to clamp the electrode at the point of intersection of the passageways for locking the electrode in its set position.

In testimony whereof I hereunto affix my signature.

FRED P. McBERTY.